(12) United States Patent
Murakami (10) Patent No.: US 8,757,989 B2
(45) Date of Patent: Jun. 24, 2014

(54) MOTOR-DRIVEN COMPRESSOR

(75) Inventor: Kazuo Murakami, Aichi-ken (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 762 days.

(21) Appl. No.: 12/547,759

(22) Filed: Aug. 26, 2009

(65) Prior Publication Data

US 2011/0020153 A1    Jan. 27, 2011

(30) Foreign Application Priority Data

Sep. 2, 2008  (JP) .................................. 2008-224390

(51) Int. Cl.
    *F04B 35/04*    (2006.01)
(52) U.S. Cl.
    USPC ..................................................... 417/410.5
(58) Field of Classification Search
    USPC ............................. 418/55.1–55.3; 417/410.5
    See application file for complete search history.

(56) References Cited

U.S. PATENT DOCUMENTS

| | | | |
|---|---|---|---|
| 4,749,344 A * | 6/1988 | Tomita et al. | 418/55.6 |
| 6,321,563 B1 * | 11/2001 | Ikeda et al. | 62/505 |
| 7,025,577 B2 * | 4/2006 | Ioi et al. | 417/371 |
| 2006/0247827 A1 | 11/2006 | Fukasaku et al. | |

FOREIGN PATENT DOCUMENTS

| | | |
|---|---|---|
| CN | 1854521 A | 11/2006 |
| JP | 2000-291557 A | 10/2000 |
| JP | 2007-315374 A | 12/2007 |
| JP | 2008-082279 A | 4/2008 |

OTHER PUBLICATIONS

Chinese Office Action for corresponding Chinese Patent Application No. 200910168174.8 dated Mar. 16, 2011.

* cited by examiner

*Primary Examiner* — Charles Freay
*Assistant Examiner* — Philip Stimpert
(74) *Attorney, Agent, or Firm* — Sughrue Mion, PLLC (57) ABSTRACT

A motor-driven compressor includes a compression mechanism for compressing refrigerant, an electric motor for driving the compression mechanism, an inverter for controlling the operation of the electric motor, and a motor harness for electrically connecting the electric motor to the inverter. The compression mechanism and the electric motor are mechanically connected each other. The electric motor has first and second coil ends. The first coil end is located on the side of the compression mechanism and the inverter is located on the side of the second coil end. The motor harness is led out from the first coil end.

9 Claims, 8 Drawing Sheets

MOTOR-DRIVEN COMPRESSOR

BACKGROUND OF THE INVENTION

The present invention relates to a motor-driven compressor, and more particularly to a motor-driven compressor that has a compression mechanism, an electric motor and an inverter aligned in the order in axial direction of the compressor.

A conventional motor-driven compressor is disclosed in Japanese Unexamined Patent Application Publication No. 2000-291557. The compressor has a compression mechanism, an electric motor and an inverter aligned in the order in axial direction of the compressor. The interior of the compressor housing is divided into two spaces by a partition wall. The electric motor is accommodated in one of the spaces, while the inverter is accommodated in the other space. The compressor further has a hermetic terminal provided on the partition wall for electrically connecting the electric motor and the inverter The electric motor and the inverter are electrically connected to the hermetic terminal.

In the above-described compressor, the electric motor and the hermetic terminal are electrically connected through a motor harness extending from the coil end of the electric motor. It is desired to reduce the length of such motor harness in order to prevent the motor harness from being pinched between the parts in assembling the compressor and also from interfering with the moving parts of the compressor such as the drive shaft and the rotor. Therefore, the coil end of the electric motor connected to the motor harness is generally located on the side of the inverter so that the length of the motor harness is set to minimum. In such a case, however, the motor harness of small length needs to be connected to the hermetic terminal in a narrow space between the electric motor and the partition wall in assembling the compressor, which makes it difficult and troublesome to perform the connection between the motor harness and the hermetic terminal. That is, the time required for such connection is increased in assembling the compressor, and manufacturing cost of the compressor is increased, accordingly.

The axial length of the coil end of the electric motor on the side of the compression mechanism, that is, on the opposite side from the motor harness is smaller than the axial length of the coil end on the side of the inverter, that is, on the side of the motor harness. On the other hand, there is an empty space around the shaft support of the compressor where the bearing is mounted for rotatably supporting the drive shaft. If the coil end located on the side of the compression mechanism can be provided in the empty space, the axial length of the compressor is reduced. In such a case, however, the position of the electric motor cannot be moved in such a way that such coil end is provided in the empty space. This is because the rotor has generally balancers at the opposite ends thereof for reducing the vibration generated by the rotating drive shaft and rotor, and the balancer on the side of the compression mechanism is located in opposing relation to the bearing described above. That is, the electric motor having the coil end connected to the motor harness on the side of the inverter makes it difficult to reduce the axial length of the compressor for downsizing.

The present invention is directed to providing a motor-driven compressor of reduced manufacturing cost and reduced size.

SUMMARY OF THE INVENTION

In accordance with an aspect of the present invention, a motor-driven compressor includes a compression mechanism for compressing refrigerant, an electric motor for driving the compression mechanism, an inverter for controlling the operation of the electric motor, and a motor harness for electrically connecting the electric motor to the inverter The compression mechanism and the electric motor are mechanically connected each other. The electric motor has first and second coil ends. The first coil end is located on the side of the compression mechanism and the inverter is located on the side of the second coil end. The motor harness is led out from the first coil end.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

Figure 1:
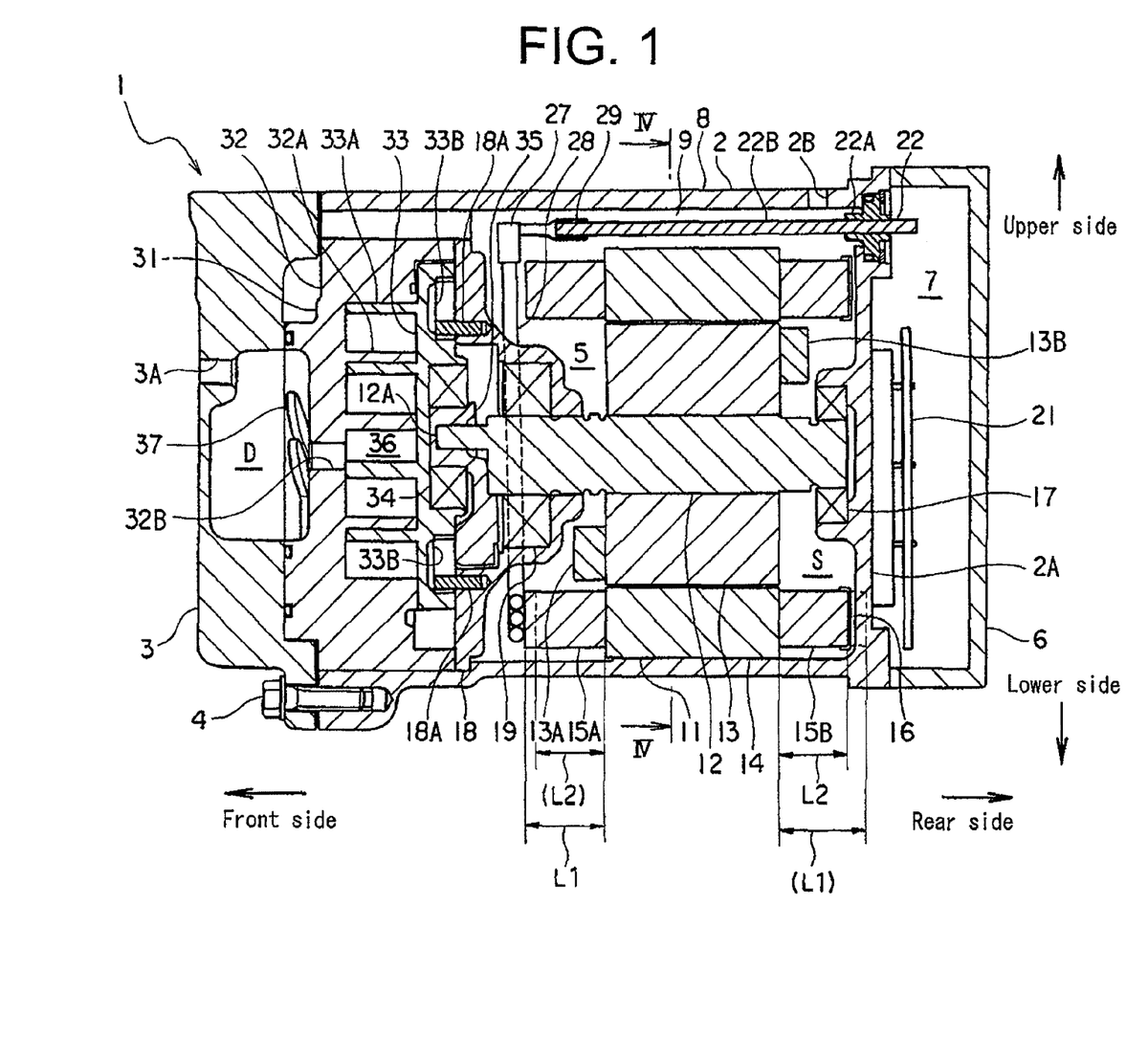
FIG. 1 is a longitudinal sectional view of a motor-driven compressor according to a first embodiment of the present invention.

FIG. 1 shows a motor-driven compressor 1 (hereinafter referred to merely as compressor 1) according to the first embodiment of the present invention. It is noted that the left-hand side as viewed in FIG. 1 is the front side and the right-hand side is the rear side of the compressor 1, respectively, and that the upper and lower sides as viewed in FIG. 1 are the upper and lower sides of the compressor 1 when installed in place, respectively, as indicated by arrows. The compressor 1 has a cylindrical motor housing 2 the front end of which is opened. The motor housing 2 is connected at the front end thereof to a front housing 3 by bolts 4. The motor housing 2 cooperates with the front housing 3 to form a space 5 for accommodating therein an electric motor 11 and a compression mechanism 31 that is driven by the electric motor 11.

The motor housing 2 has an end wall 2A that is connected to an inverter housing 6 by bolts (not shown). The inverter housing 6 forms therein an inverter space 7 in which an inverter 21 is mounted to the end wall 2A of the motor housing 2. That is, the end wall 2A of the motor housing 2 separates the electric motor 11 from the inverter 21. The inverter 21 converts direct-current power supplied from external equipment into three-phase alternating current power to be supplied to the electric motor 11. The rotational speed of the electric motor 11 is controlled by the inverter 21. The compression mechanism 31, the electric motor 11 and the inverter 21 are aligned in the order in axial direction of the compressor 1.

The electric motor 11 is a three-phase synchronous motor driven by the three-phase alternating current power supplied from the inverter 21. The electric motor 11 has a drive shaft 12 extending in the space 5 of the motor housing 2. The drive shaft 12 is fitted into a cylindrical rotor 13 for rotation therewith. The rotor 13 is surrounded by a stator 14 that is fitted into the motor housing 2. Three-phase alternating current power is supplied to a coil wound on the stator 14 thereby to rotate the drive shaft 12 and the rotor 13. The rear end of the drive shaft 12 is rotatably supported by a bearing 17 that is mounted in the end wall 2A of the motor housing 2. The drive shaft 12 extends through a shaft support 18 located forward of the electric motor 11. The front end of the drive shaft 12 is rotatably supported by a bearing 19 that is mounted in the shaft support 18.

Figure 2:
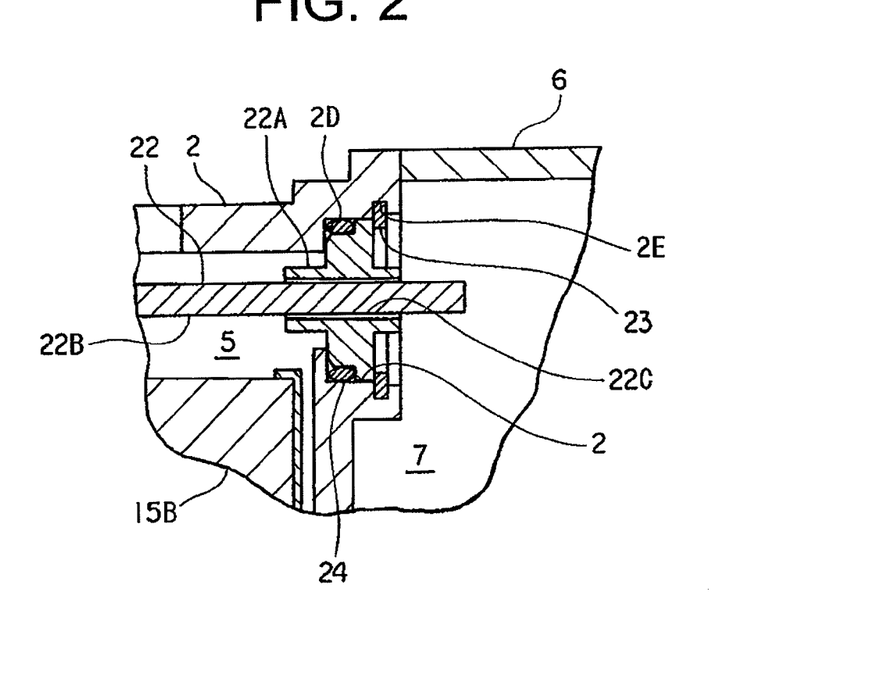
FIG. 2 is an enlarged fragmentary view showing a hermetic terminal of the motor-driven compressor of FIG. 1.
Figure 3:
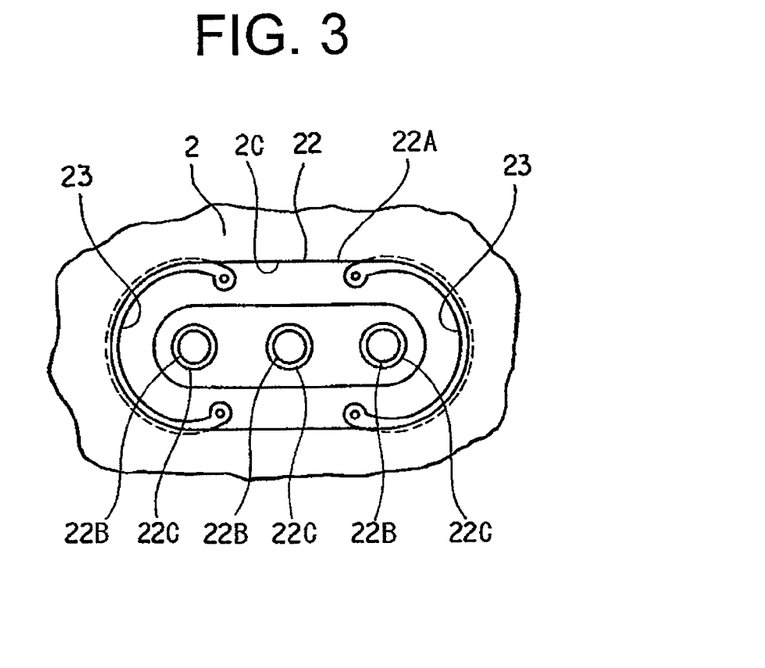
FIG. 3 is a fragmentary plan view of the hermetic terminal of FIG. 2.

The compressor 1 has a hermetic terminal 22 mounted to the end wall 2A of the motor housing 2 for electrically connecting the electric motor 11 and the inverter 21. Referring to FIGS. 2 and 3, the hermetic terminal 22 has a terminal base 22A generally in the form of an oval and three conductive members 22B extending through the terminal base 22A. The three conductive members 22B correspond to the respective phases of the electric motor 11. Each conductive member 22B is fixedly mounted to and bonded integrally with the terminal base 22A by an adhesive 22C. The terminal base 22A is disposed in a hole 2C that is formed through the end wall 2A of the motor housing 2. The hole 2C has a step 2D and a groove 2E formed in the inner peripheral surface thereof. The hermetic terminal 22 is mounted to the end wall 2A of the motor housing 2 so that the terminal base 22A supported on the step 2D is retained by use of two C-rings 23 that are fitted into the groove 2E. The space 5 of the motor housing 2 is hermetically sealed from the inverter space 7 of the inverter housing 6 by an O-ring 24 that is disposed between the inner peripheral surface of the hole 2C and the outer peripheral surface of the terminal base 22A of the hermetic terminal 22.

Figure 4:
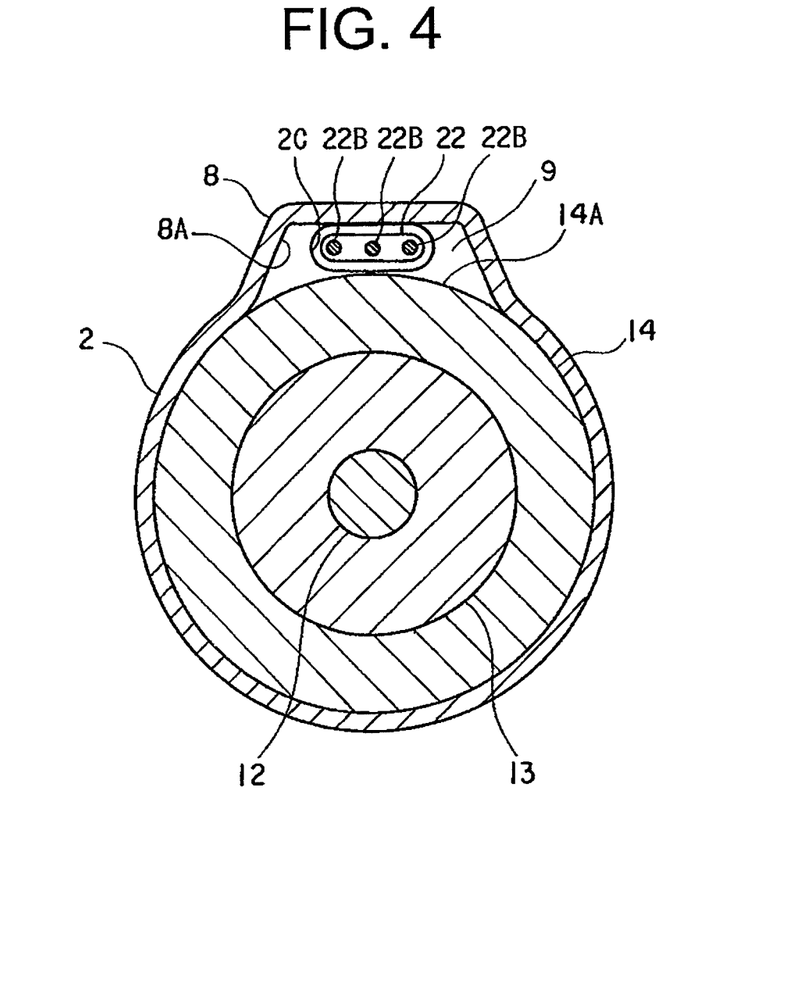
FIG. 4 is a cross-sectional view taken along the line IV-IV of FIG. 1.

Referring to FIG. 41 the upper part of the motor housing 2 projects radially outward thereby to form a radially expanded portion 8. The expanded portion 8 forms therein a wiring passage 9 that is defined by the inner peripheral surface 8A of the expanded portion 8 and the outer peripheral surface 14A of the stator 14 of the electric motor 11. The conductive members 22B of the hermetic terminal 22 are disposed in the wiring passage 9, extending therethrough.

The following will describe in detail the arrangement of the electric motor 11 and its related components in the motor housing 2 with reference to FIG. 1. As shown in FIG. 1, part of the coil wound on the stator 14 projects forward and rearward from the respective opposite ends of the stator 14 thereby to form a coil end 15A (a first coil end) on the side of the compression mechanism 31 and a coil end 15B (a second coil end) on the side of the inverter 21. That is, the coil end 15A projects from the stator 14 toward the compression mechanism 31, and the coil end 15B projects from the stator 14 toward the inverter 21. The compressor 1 has a motor harness 27 that is led out from the coil end 15A for electrically connecting the electric motor 11 and the conductive members 22B of the hermetic terminal 22. The coil end 15A has the axial length L1 that is greater than the axial length L2 of the coil end 15B because the motor harness 27 needs to be led out from the coil end 15A. That is, the projecting length of the coil end 15A from the stator 14 is greater than the projecting length of the coil end 15B from the stator 14. The rotor 13 has balancers 13A and 13B at the front and rear ends thereof, respectively, for reducing the vibration generated by the rotation of the drive shaft 12 and rotor 13.

The electric motor 11 has on the side of the compression mechanism 31 the coil end 15A that is connected to the motor harness 27. If the coil end 15A having the length L1 is located on the side of the inverter 21, part of the coil end 15A projects out of the space 5 into the end wall 2A of the motor housing 2, as indicated by dashed line in FIG. 1. On the other hand, if the coil end 13B having the length L2 is located on the side of the compression mechanism 31, the axial clearance between the coil end 15B and the shaft support 18 is increased, as indicated by dashed line in FIG. 1. However, since the balancer 13A of the rotor 13 of the electric motor 11 is opposed to the shaft support 18 as viewed in the axial direction of the compressor 1, the position of the whole electric motor 11 cannot be moved forward any more, despite the presence of such increased clearance. Therefore, if the coil ends 15A and 15B of the electric motor 11 are provided contrary to those of the present embodiment, the size of the motor housing 2 needs to be enlarged for accommodating the electric motor 11 in such a way that the position of the end wall 2A is moved further rearward. According to the present embodiment, however, the electric motor 11 has the coil end 15A connected to the motor harness 27 on the side of the compression mechanism 31, resulting in reduced axial length of the compressor 1.

The motor harness 27 has a lead wire 28 led out from the lower part of the coil end 1 5A and extending upward along the inner peripheral surface of the motor housing 2. The lead wire 28 is connected at the upper end thereof to a connecting terminal 29 (a connecting portion) of the motor harness 27. The connecting terminal 29 is connected to the ends of the conductive members 22B extending in the wiring passage 9 to a position above the coil end 15A. That is, the conductive members 22B of the hermetic terminal 22 are connected to the motor harness 27 at the connecting terminal 29 that is located in the wiring passage 9. The compressor 1 has a ring-shaped insulator 16 made of an electrically insulating material and having a cross section in the form of a channel. The insulator 16 is located between the coil end 15B of the electric motor 11 and the end wall 2A of the motor housing 2. The insulator 16 is provided on the rear end of the coil end 15B and prevents electrical leakage from the coil end 15B to the end wall 2A of the motor housing 2, thereby allowing the clearance between the coil end 15B and the end wall 2A to be reduced. That is, the insulator 16 provided on the coil end 15B allows the axial length of the compressor 1 to be reduced.

The motor housing 2 forms therein a suction space S defined between the end wall 2A and the electric motor 11. The suction space S communicates with the external refrigerant circuit through an inlet port 2B that is formed in the upper part of the motor housing 2 so as to open to the wiring passage 9. On the other hand, a discharge space D is defined between the front housing 3 and the front end of the compression mechanism 31. The discharge space D communicates with the external refrigerant circuit through an outlet port 3A that is formed in front housing 3.

The drive shaft 12 extending through the shaft support 18 is connected at the front end thereof to the compression mechanism 31. The electric motor 11 and the compression mechanism 31 are mechanically connected each other. The compression mechanism 31 has a fixed scroll 32 fixedly mounted to the motor housing 2 and a movable scroll 33 located rearward of the fixed scroll 32. The drive shaft 12 has at the front end thereof an eccentric pin 12A that is eccentric to the axis of the drive shaft 12. The eccentric pin 12A is connected to the movable scroll 33 through a bearing 34 and a bush 35 fitted in the rear part of the movable scroll 33. The rotation of the movable scroll 33 on its own axis is prevented by pins 18A the rear ends of which are fixed to the shaft support 18 and recesses 33B formed in the movable scroll 33 and receiving therein the front ends of the respective pins 18A.

The fixed scroll 32 has a fixed wrap 32A projecting rearward, and the movable scroll 33 has a movable wrap 33A projecting forward and facing the scroll wall 32A of the fixed scroll 32. The fixed scroll 32 cooperates with the movable scroll 33 to form therebetween a compression chamber 36 that is defined by the wraps 32A and 33A. The fixed scroll 32 has at the center thereof a discharge port 32B, and the compression chamber 36 is communicable with the discharge space D through a discharge valve 37 at the discharge port 32B. The suction space S communicates with the compression chamber 36 through the wiring passage 9 where the conductive members 22B of the hermetic terminal 22 are disposed for electrically connecting the electric motor 11 and the hermetic terminal 22. That is, the wiring passage 9 serves as a suction passage of the compressor I through which refrigerant is introduced from the suction space S into the compression chamber 36.

In the above-described compressor 1, when power is supplied from the inverter 21 to the coil of the electric motor 11, the rotor 13 is rotated with the drive shaft 12 to rotate the movable scroll 33 of the compression mechanism 31. The volume of the compression chamber 36 between the fixed and movable scrolls 32 and 33 is varied with the rotation of the movable scroll 33, and refrigerant is introduced from the external refrigerant circuit via the inlet port 2B, the suction space S and the wiring passage 9 into the compression chamber 36. After being compressed in the compression chamber 36, the refrigerant is discharged via the discharge port 32B and the discharge valve 37 of the fixed scroll 32 into the discharge space D. The refrigerant is further discharged out of the compressor 1 via the outlet port 3A, then flowing through the external refrigerant circuit and back into the compressor 1 through the inlet port 2B.

Figure 5:
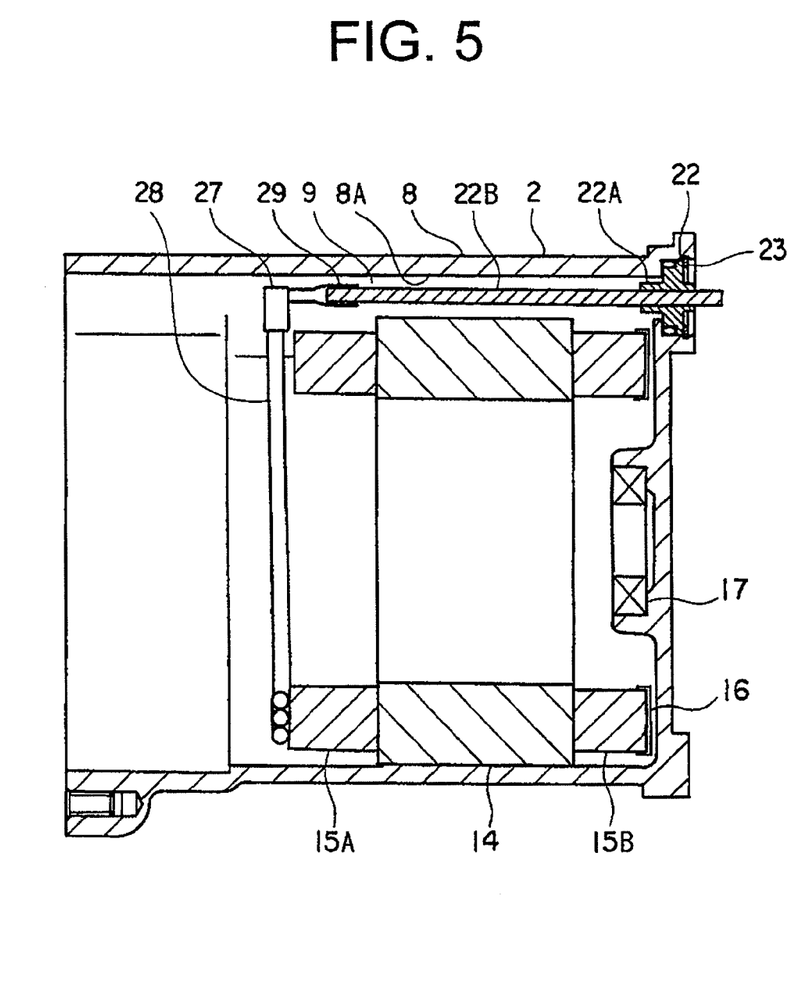
FIG. 5 is a schematic view for explaining the method of connection between the electric motor and the inverter of the compressor of FIG. 1.

FIG. 5 is a schematic view for explaining the method of connection between the electric motor 11 and the inverter 21 of the compressor 1. The bearing 17 is mounted to the end wall 2A of the motor housing 2, and the stator 14 having the motor harness 27 previously connected to the coil end 15A is fitted into the motor housing 2. Then the hermetic terminal 22 is mounted to the end wall 2A of the motor housing 2 and fixed by use of the C-rings 23, and the connecting terminal 29 of the motor harness 27 is connected to the conductive members 22B of the hermetic terminal 22.

The coil end 15A of the electric motor 11 connected to the motor harness 27 is located on the side of the compression mechanism 31 (see FIG. 1), that is, on the front side of the compressor 1. Therefore, the conductive members 22B of the hermetic terminal 22 are easily and quickly connected to the connecting terminal 29 of the motor harness 27 in the front part of the space 5 that is large enough for the connection. After the connection between the hermetic terminal 22 and the motor harness 27 is completed, the shaft support 18 and the compression mechanism 31 (see FIG. 1) are inserted in the motor housing 2, along with the drive shaft 12 previously integrated with the rotor 13, and the front housing 3 is connected to the motor housing 2. On the other hand, the inverter 21 is mounted to the end wall 2A of the motor housing 2 and electrically connected to the hermetic terminal 22, and then the inverter housing 6 is connected to the motor housing 2.

In the above-described compressor 1 having the compression mechanism 31, the electric motor 11 and the inverter 21 aligned in the order, the coil end 15A of the electric motor 11 connected to the motor harness 27 is located on the side of the compression mechanism 31. In such a case, since the connection between the electric motor 11 and the inverter 21 need not to be performed in a narrow space formed between the coil end 15B of the electric motor 11 and end wall 2A of the motor housing 2, the connection becomes easy. In addition, the coil end 15B of smaller length on the side of the inverter 21 allows the axial length of the compressor 1 to be reduced. Thus, manufacturing cost of the compressor 1 is reduced by such easy connection in assembling the compressor 1, and the size of the compressor 1 is reduced by such reduced axial length.

The conductive members 22B of the hermetic terminal 22 are disposed in the wiring passage 9 that is defined by the inner peripheral surface 8A of the expanded portion 8 and the outer peripheral surface of the stator 14. In such a case, the external diameter of the compressor 1 can be reduced, for example, as compared to a case wherein the wiring passage is provided by a hole extending in the axial direction of the compressor 1 within the wall of the motor housing 2.

Since the wiring passage 9 also serves as a suction passage through which refrigerant is introduced into the compression chamber 36 of the compression mechanism 31, it is not necessary to provide any additional passage in the motor housing 2 for introducing refrigerant, resulting in further reduced external diameter of the compressor 1.

Since the insulator 16 is provided on the coil end 15B of the electric motor 11 on the side of the inverter 21, electrical leakage from the coil end 15B to the end wall 2A of the motor housing 2 is prevented. Therefore, the distance between the coil end 15B and the end wall 2A, that is, the distance between the electric motor 11 and the inverter 21 can be reduced, and the axial length of the compressor 1 is further reduced.

Figure 6:
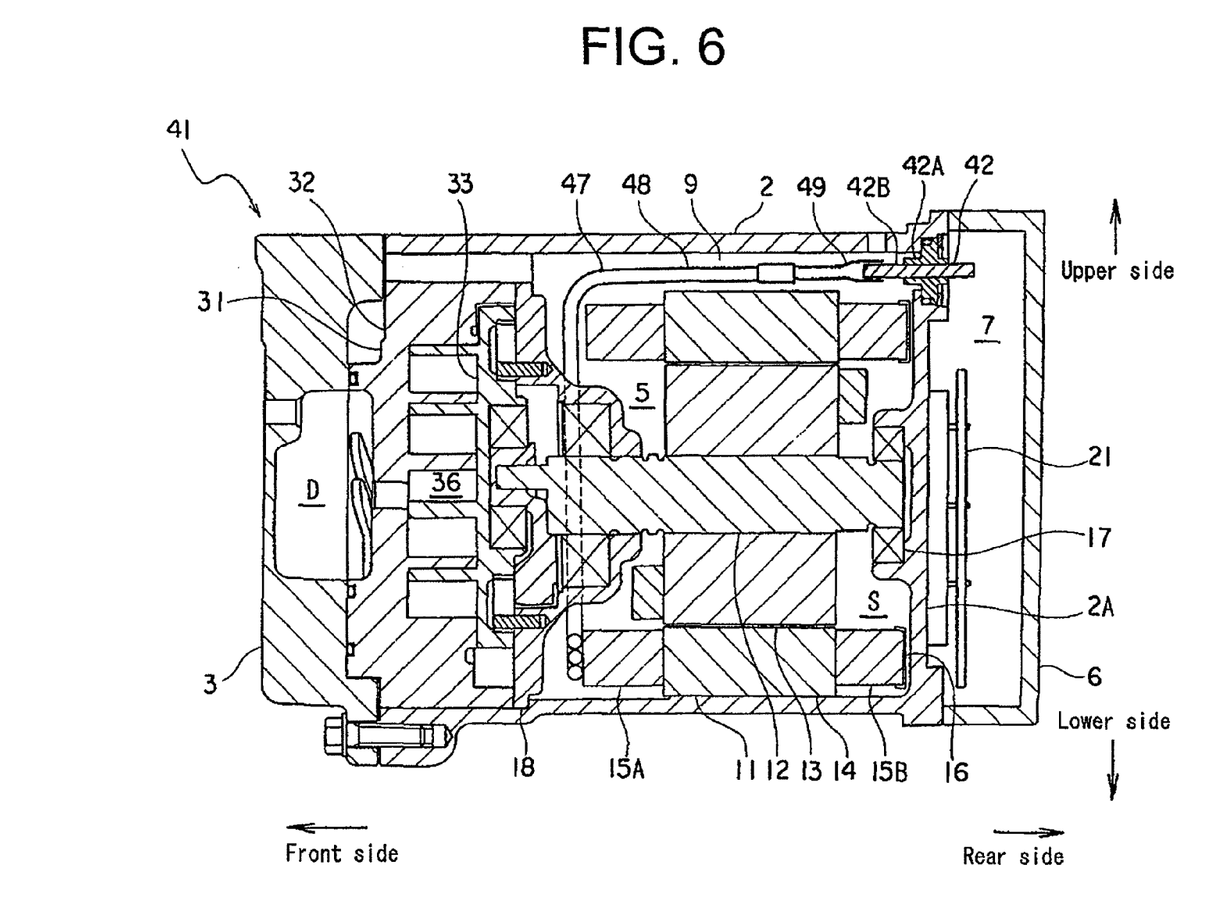
FIG. 6 is a longitudinal sectional view of a motor-driven compressor according to a second embodiment of the present invention.
Figure 7:
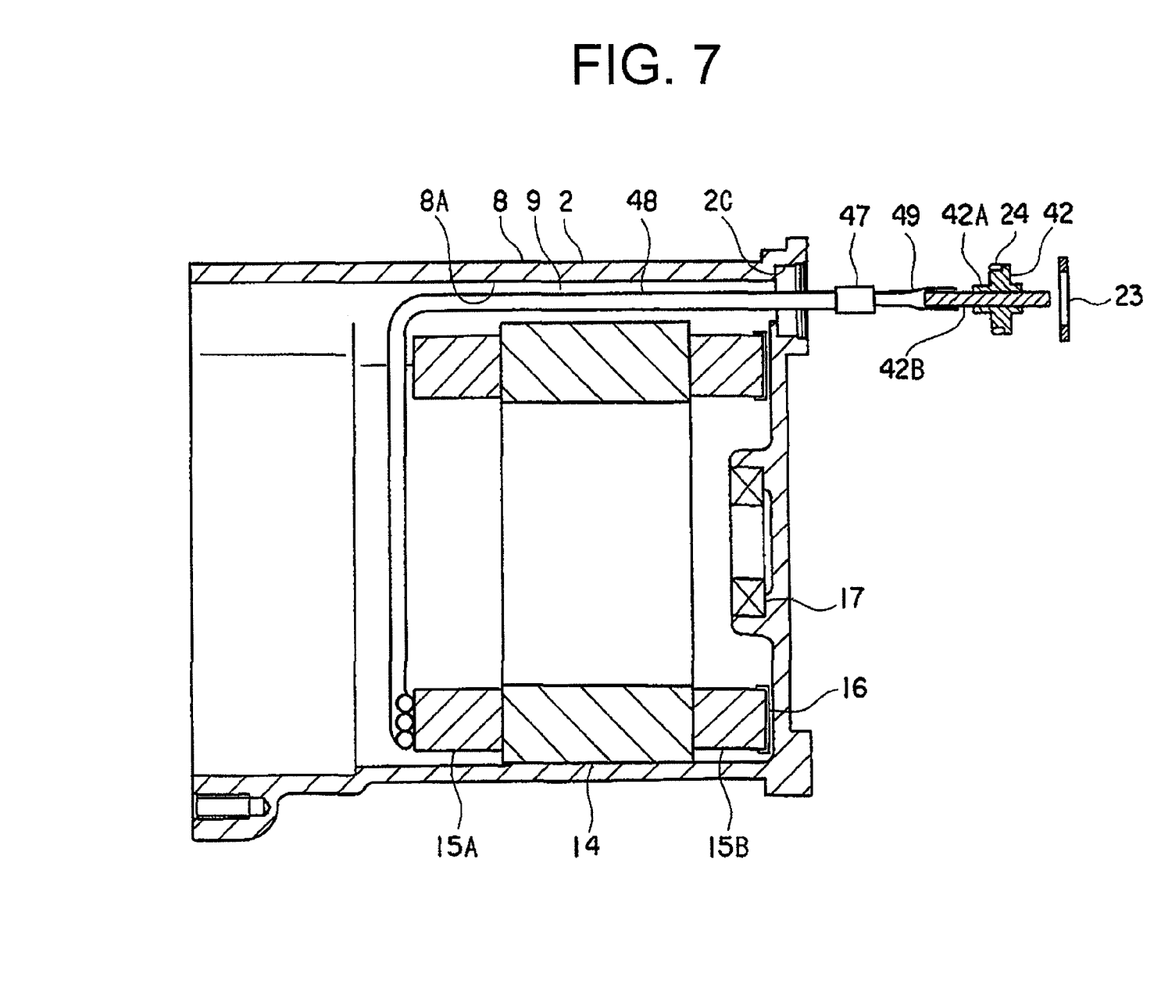
FIG. 7 is a schematic view for explaining the method of connection between the electric motor and the inverter of the compressor of FIG. 6.

The following will describe a motor-driven compressor 41 according to the second embodiment of the present invention with reference to FIGS. 6 and 7. In FIGS. 6 and 7, same reference numerals are used for the common elements or components in the first embodiment, and the description of such elements or components for the second embodiment will be omitted. The second embodiment differs from the first embodiment in that the hermetic terminal 22 and the motor harness 27 of the first embodiment are replaced with a hermetic terminal 42 and a motor harness 47, respectively.

Referring to FIG. 6, the hermetic terminal 42 is mounted to the end wall 2A of the motor housing 2. The hermetic terminal 42 has a terminal base 42A and conductive members 42B extending through the terminal base 42A. The structure of the terminal base 42A is similar to that of the terminal base 22A of the first embodiment. However, the length of the conductive member 42B is smaller than that of the conductive member 22B of the first embodiment, and the conductive member 42B extends in the wiring passage 9 only to a position immediately above the coil end 15B that is located on the side of the inverter 21. The motor harness 47 is led out from the coil end 15A of the electric motor 11 on the side of the compression chamber 31. The motor harness 47 has a lead wire 48 led out from the lower part of the coil end 15A and extending upward along the front side of the electric motor 11. The lead wire 48 further extends rearward in the wiring passage 9 and is connected at the rear end thereof to a connecting terminal 49 (a connecting portion) that is connected to the ends of the conductive members 42B of the hermetic terminal 42. Thus, the length of the motor harness 47 is greater than that of the motor harness 22 of the first embodiment.

In the above-described compressor 41, the connection between the electric motor 11 and the inverter 21 is performed outside the motor housing 2, as shown in FIG. 7. Specifically, after the stator 14 is fitted into the motor housing 2, the motor harness 47 previously connected to the stator 14 is pulled out of the motor housing 2 through the hole 2C of the end wall 2A and connected to the conductive members 42B of the hermetic terminal 42. Then the hermetic terminal 42 is inserted in the hole 2C and fixed to the motor housing 2 by the C-rings 23.

Thus, the shorter conductive member 42B and the longer motor harness 47 allow the axial length of the compressor 41 to be reduced, and the connection between the hermetic terminal 42 and the motor harness 47 can be easily performed outside the motor housing 2.

Figure 8:
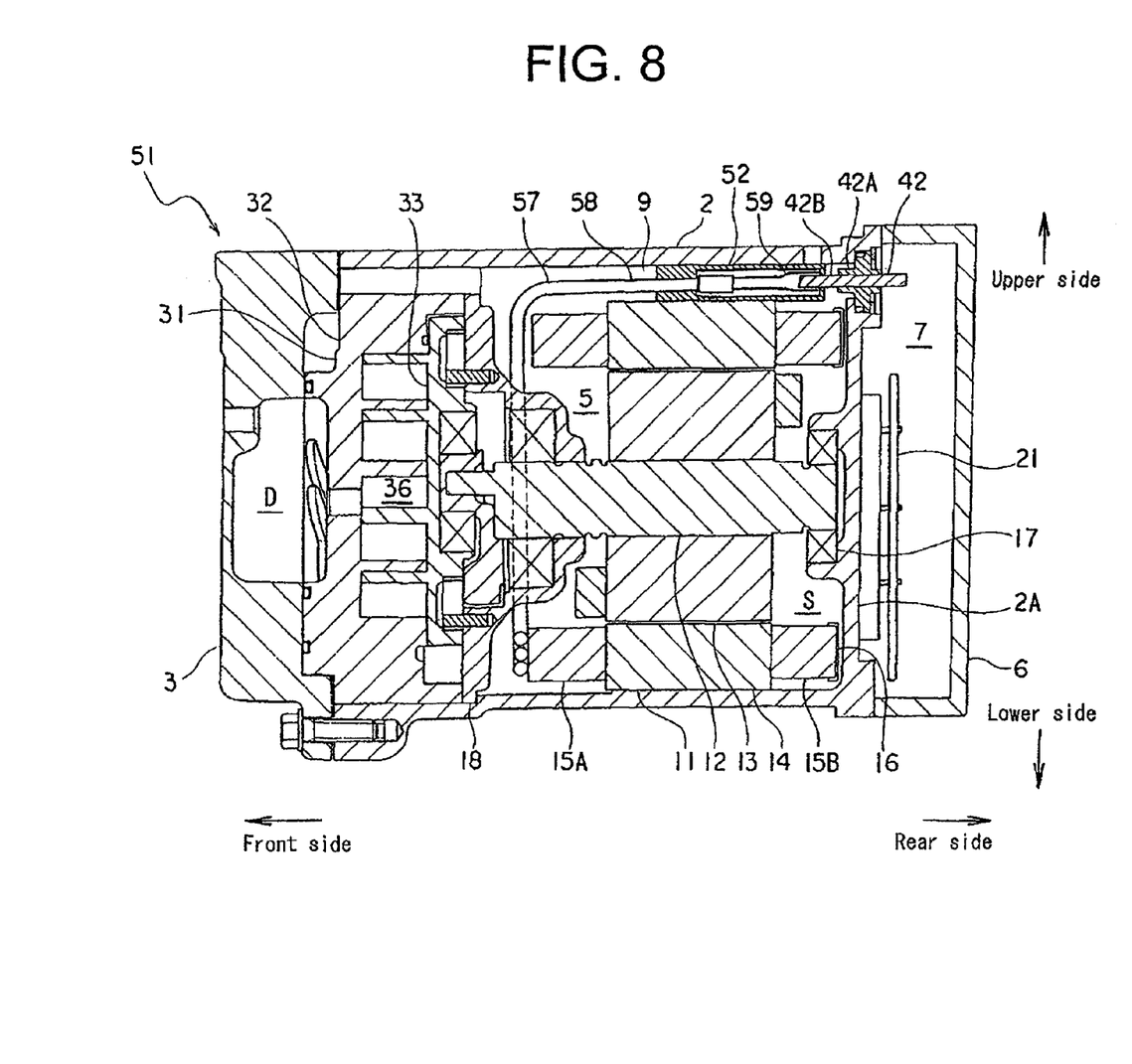
FIG. 8 is a longitudinal sectional view of a motor-driven compressor according to a third embodiment of the present invention.
Figure 9:
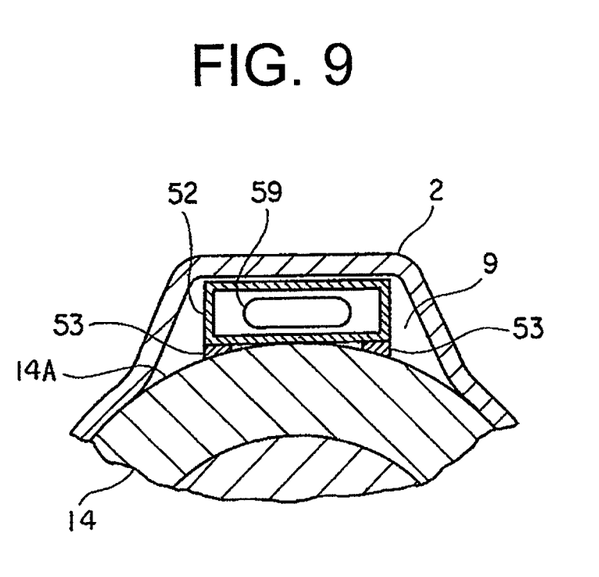
FIG. 9 is a fragmentary cross-sectional view of the motor-driven compressor of FIG. 8.

The following will describe a motor-driven compressor 51 according to the third embodiment of the present invention with reference to FIGS. 8 and 9. In FIGS. 8 and 9, same reference numerals are used for the common elements or components in the first and second embodiments of FIGS. 1 through 7, and the description of such elements or components for the third embodiment will be omitted. The third embodiment differs from the second embodiment in that a cluster block 52 is provided for connecting a motor harness 57 and the hermetic terminal 42.

Referring to FIG. 8, the hermetic terminal 42 is connected to the motor harness 57 through the cluster block 52 that is located in the rear part of the wiring passage 9. The cluster block 52 is fixedly mounted on the outer peripheral surface of the stator 14 by use of bonding members 53 (see FIG. 9). The motor harness 57 has a lead wire 58 connected to the coil end 15A of the electric motor 11 on the side of the compression mechanism 31 and a connecting terminal 59 (a connecting portion) provided at the end of the lead wire 58. The connecting terminal 59 is located in the cluster block 52. In assembling the compressor 51, firstly, the stator 14 having the cluster block 52 previously mounted thereto is fitted into the motor housing 2 so that the cluster block 52 is positioned in the rear part of the wiring passage 9. Then the hermetic terminal 42 is mounted to the end wall 2A of the motor housing 2 so that the conductive members 42B of the hermetic terminal 42 are inserted in the cluster block 52 and connected to the connecting terminal 59. Thus, the connection between the coil end 15A of the electric motor 11 and the hermetic terminal 42 is completed. Since the motor harness 57 needs not to be pulled out of the motor housing 2 for the connection, differently from the motor harness 47 of the second embodiment, the length of the motor harness 57 may be smaller than that of the motor harness 47.

As described above, the hermetic terminal 42 and the motor harness 57 are connected through the cluster block 52 that is mounted on the outer peripheral surface of the stator 14 in the wiring passage 9. In assembling the compressor 51, the hermetic terminal 42 is mounted to the end wall 2A of the motor housing 2, simultaneously with the electrical connection between the hermetic terminal 42 and the coil end 15A of the electric motor 11. Therefore, the connection between the hermetic terminal 42 and the coil end 15A of the electric motor 11 becomes easier and the time required for the connection is reduced, resulting in further reduced manufacturing cost of the compressor 51.

What is claimed is:

1. A motor-driven compressor, comprising:
 a compression mechanism for compressing refrigerant;
 an electric motor having a rotor and a stator on which a coil is wound;
 a motor housing accommodating therein the electric motor;
 a drive shaft connected to the compression mechanism and fitted in the rotor for driving the compression mechanism;
 an inverter for controlling the operation of the electric motor, the inverter being mounted in an inverter space, wherein the compression mechanism, the electric motor, and the inverter space are located in an axial direction of the drive shaft, and the electric motor is located between the compression mechanism and the inverter space; and
 a motor harness for electrically connecting the electric motor to the inverter,
 wherein part of the coil projects from both axial ends of the stator to form first and second coil ends, the first coil end being arranged between the stator and the compression mechanism, and the second coil end being arranged between the stator and the inverter space, wherein the motor harness is led out from the first coil end and extends between an inner peripheral surface of the motor housing and an outer peripheral surface of the electric motor toward the second coil end.

2. The motor-driven compressor according to claim 1, further comprising:
 a hermetic terminal mounted to the motor housing and having a conductive member that is connected to the motor harness at a connecting portion in the motor housing,
 wherein the motor housing accommodates therein the compression mechanism, the motor housing has a wiring passage that is defined by the inner peripheral surface of the motor housing and the outer peripheral surface of the electric motor, and the motor harness or the conductive member are located in the wiring passage.

3. The motor-driven compressor according to claim 2, wherein the connecting portion is located in the wiring passage.

4. The motor-driven compressor according to claim 2, wherein the first coil end projects from the stator toward the compression mechanism, and the second coil end projects from the stator toward the inverter.

5. The motor-driven compressor according to claim 4, wherein the projecting length of the first coil end from the stator is greater than the projecting length of the second coil end from the stator.

6. The motor-driven compressor according to claim 5, wherein the motor housing has an end wall that separates the electric motor from the inverter, and the hermetic terminal is mounted to the end wall.

7. The motor-driven compressor according to claim 6, further comprising an insulator that is located between the second coil end of the electric motor and the end wall of the motor housing.

8. The motor-driven compressor according to claim 2, wherein the wiring passage serves as a suction passage through which refrigerant is introduced into the compression mechanism.

9. The motor-driven compressor according to claim 2, further comprising a cluster block that is mounted on the outer peripheral surface of the electric motor in the wiring passage, wherein the hermetic terminal and the motor harness are connected through the cluster block.

\* \* \* \* \*